United States Patent
Maggert et al.

(10) Patent No.: US 6,765,366 B2
(45) Date of Patent: Jul. 20, 2004

(54) DUAL MOUNT CHARGER WITH INVERTING DISPLAY

(75) Inventors: Kevin Maggert, Lawrenceville, GA (US); Charles Friedli, Lawrenceville, GA (US); Due Q. Huynh, Lawrenceville, GA (US); Brian Pozsgay, Lilburn, GA (US)

(73) Assignee: Motorola, Inc., Schaumburg, IL (US)

( * ) Notice: Subject to any disclaimer, the term of this patent is extended or adjusted under 35 U.S.C. 154(b) by 69 days.

(21) Appl. No.: 10/280,366

(22) Filed: Oct. 25, 2002

(65) Prior Publication Data

US 2004/0080298 A1 Apr. 29, 2004

(51) Int. Cl.[7] .............................................. H01M 10/46
(52) U.S. Cl. ....................................................... 320/114
(58) Field of Search ................................. 320/107, 110, 320/112, 113, 114, 115, 116; 429/99, 100; 349/58

(56) References Cited

U.S. PATENT DOCUMENTS

| | | | |
|---|---|---|---|
| 4,396,881 A | 8/1983 | Cook et al. | |
| 4,817,194 A | 3/1989 | Andros, Jr. | |
| 5,159,546 A | 10/1992 | Inoue et al. | |
| 5,726,555 A | 3/1998 | Takamoro | |
| D397,084 S | 8/1998 | Siddoway | |
| 6,078,871 A | 6/2000 | Anderson | |
| 6,359,239 B1 | 3/2002 | Missler et al. | |
| 2002/0158999 A1 * | 10/2002 | Shima | 349/58 |

OTHER PUBLICATIONS

Data Sheet—S6A 0093 Samsung LCD Driver (First 8 pages included) Full document (59 pages) Can Be Downloaded at www.samsungelectronics/semiconductors/system_LSI, character/S6AC093A/S6A0093htm.

* cited by examiner

Primary Examiner—Edward Tso
(74) Attorney, Agent, or Firm—Philip H. Burrus, IV

(57) ABSTRACT

This invention includes a charger that may be mounted either in a horizontal configuration, e.g. on a desktop, or in a vertical configuration, e.g. on a wall. The charger has pockets geometrically oriented so as to support batteries in either configuration. Each pocket includes a corresponding display. As changing from a desktop configuration to a wall mount configuration requires the user to rotate the charger by 180 degrees, a switch is provided to rotate the information shown on the display by 180 degrees. The switch is preferably recessed below the surface of the charger so as to prevent nuisance actuation. The resulting orientation of the display is stored in a non-volatile memory to prevent resets when power is removed. By holding the switch down for a predetermined amount of time, a user can send the display into a test mode so as to run diagnostics and verify proper display operation.

16 Claims, 5 Drawing Sheets

DUAL MOUNT CHARGER WITH INVERTING DISPLAY

BACKGROUND

1. Technical Field

This invention relates generally to battery chargers, and more specifically to battery chargers capable of being mounted both vertically and horizontally having displays.

2. Background Art

People today use electronic devices like pagers, personal digital assistants (PDAs), and cellular telephones all the time. These devices derive their portability from rechargeable batteries. Once a battery is fully charged, the accompanying device can be used without wires for several hours. When the stored energy in the battery is depleted, it must be recharged prior to further use.

A very popular way of charging devices is by way of a desktop charger. An example of such a charger may be found in U.S. Pat. No. D427966, entitled "Two pocket desktop charger", issued Jul. 7, 2000. This type of desktop charger may include two pockets: a first pocket for a device, like a cellular phone, with a battery coupled thereto; and a second pocket for a spare battery. In the case of a cellular phone, when the attached battery dies, the user simply inserts the phone/battery combination into the pocket and leaves it for a while. After some amount of time, generally 2–4 hours, the user removes the fully charged phone for use.

Some desktop charger manufacturers have included displays and status indicators that notify the user when the battery is fully charged. These displays take on differing forms, including light emitting diodes (LEDs), liquid crystal displays (LCSs), and audible alarms. Examples of chargers having displays include U.S. Pat. Nos. 6,078,871, 5,726,555, and 4,396,881.

For industrial users, single pocket chargers often prove to be inefficient. For example, police and fire departments often have several dozen radios in use. Using single pocket chargers is inefficient, as a very large desk space is required to accommodate such a large number of chargers. Further, as desk space becomes scarce, these users sometimes prefer to mount the chargers on the wall. Thus the "display-type" chargers in the aforementioned patents become cumbersome to use for two reasons: first the inefficiencies of the single pocket design, as noted above; and second due to the fact that wall mounted chargers must be precisely aligned so as to properly read the display.

There is thus a need for an improved charger to accommodate industrial user needs.

DETAILED DESCRIPTION OF THE INVENTION

Figure 1:
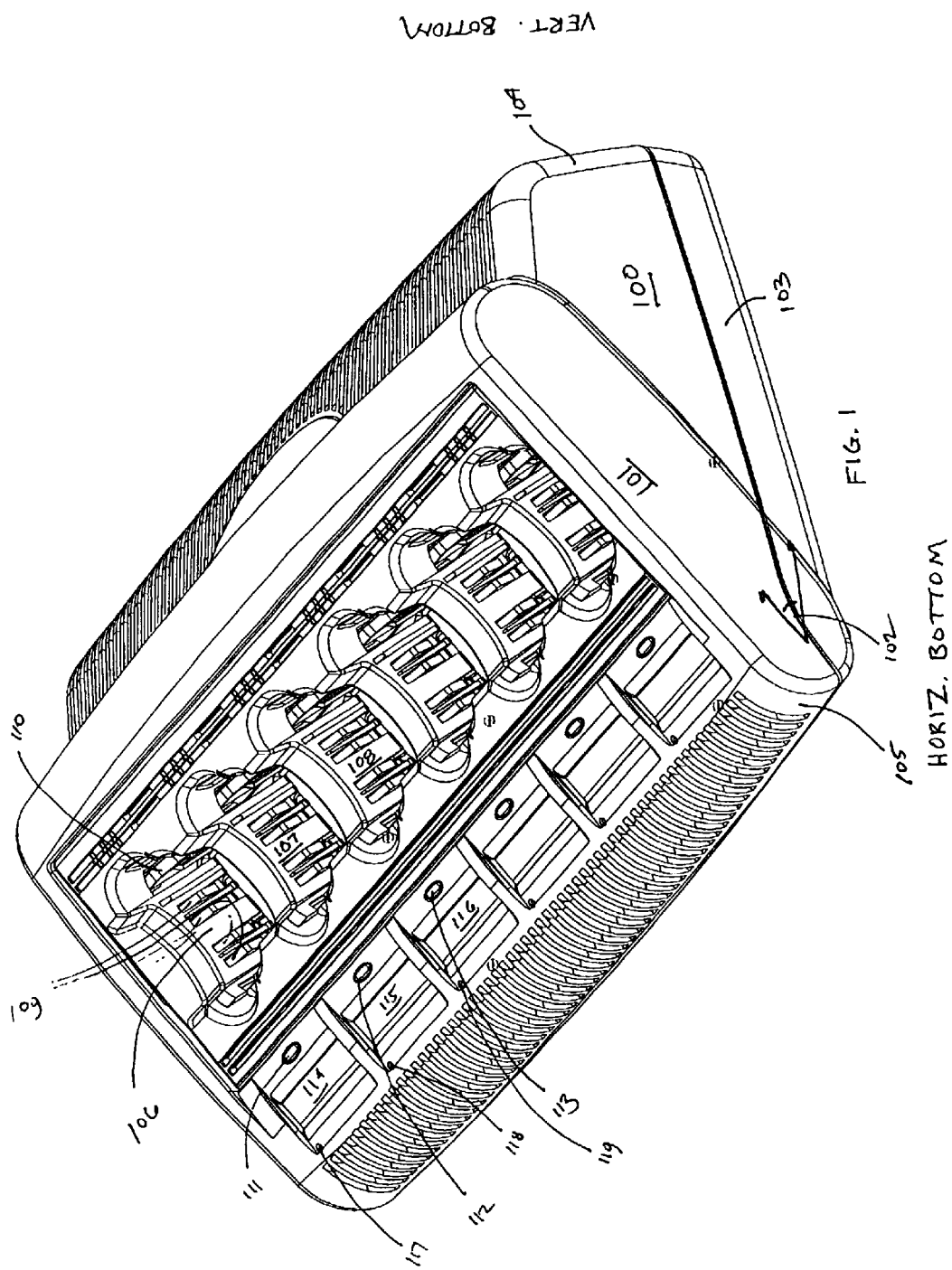
FIG. 1 is an isometric view of a charger in accordance with the invention.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Referring now to FIG. 1, illustrated therein is a charger 100 in accordance with the invention. The charger 100 is preferably manufactured from a durable, rigid injection molded plastic like a polycarbonate plastic. The charger 100 is generally a wedge shape so as to be mountable in both a horizontal configuration and a vertical configuration. The wedge is formed by way of an inclined plane 101 mounted on a base member 103. The inclined plane 101 structure causes the front 105 to be shorter than the back 104.

The charger 100 includes a plurality of pockets, e.g. 106,107,108 for accommodating a plurality of batteries. Each pocket 106–108 is preferably at least half as deep as the battery to be charged. For example, if a battery measuring three inches in length is to be charged, the pockets 106–108 should be at least 1.5 inches in depth. Each pocket includes electrical contacts coupled to circuitry disposed in the charger. For example, pocket 106 includes electrical contacts 109. The electrical contacts 109 deliver current regulated by the circuitry to the battery. The pockets preferably also include a spring-loaded mechanical lever 110 that deflects when a battery is inserted into the pocket 106. This mechanical lever 110 may couple to a switch that actuates the circuitry associated with that pocket 106 upon battery insertion.

The angle 102 formed between the inclined plane 101 and the base member 103 is critical to the "dual mountability" of the device. Acceptable angles 102 range from 30 to 60 degrees, but the angle is preferably 30 degrees. Viewing FIG. 1 with the "Horiz. Bottom" reference designator at the base, the inclined plane 101 causes batteries (which sit in the pockets 106–108 perpendicular to the inclined plane 101) to rest at an angle 60 degrees relative to the base member 103, and thus the table or bench upon which the charger 100 sits. With pockets 106–108 having a depth at least half that of the batteries to be charged, even heavy batteries like the industrial nickel-metal hydride used by police departments rest comfortably in the pockets with no fear of falling out.

Turning FIG. 1 so that the "Vert. Bottom" reference designator is at the base of the page, this orientation represents the "wall mount" configuration of the charger 100. Metal-lined holes (not shown) in the bottom of the base member 103 provide the wall mount capability. In this orientation, the inclined plane forms an angle of 60 degrees with (what would be) the floor and the direction of gravitational pull. (60 degrees is the compliment of angle 102.) Batteries inserted into the pockets 106–108 now rest at an angle of 30 degrees with the back 104, which is now parallel to the ground. Again, with pockets 106–108 having a depth at least half that of the batteries to be charged, the batteries rest comfortably in the pockets with no fear of falling out.

The charger 100 includes a plurality of light emitting diodes (LEDs), e.g. 111,112,113 associated with the respective pockets 106–108. For example, LED 111 is associated with pocket 106, and so on. The LEDs 111–113 serves as "quick look" charge status indicators. By way of example, if an LED 111 is red, this may indicate rapid charging. A flashing green LED may indicate top-off charging, and a solid green LED may indicate a fully charged battery. The LEDs 111–113 allow the user to glean a rough estimate of charging by glancing at the color.

The charger 100 further includes a plurality of displays, e.g. 114,115,116, associated with each pocket (similar to the LED association). The displays 114–116 are preferably low-power liquid crystal displays (LCDs). These displays 114–116 are driven by the charging circuitry disposed in the charger 100. They are thus capable of displaying a plethora of specific charging information, including type of battery, serial number, manufacturing information, service information, status of charge, temperature, usage histograms, charge cycle counts, reconditioning information and the like.

Figure 2:
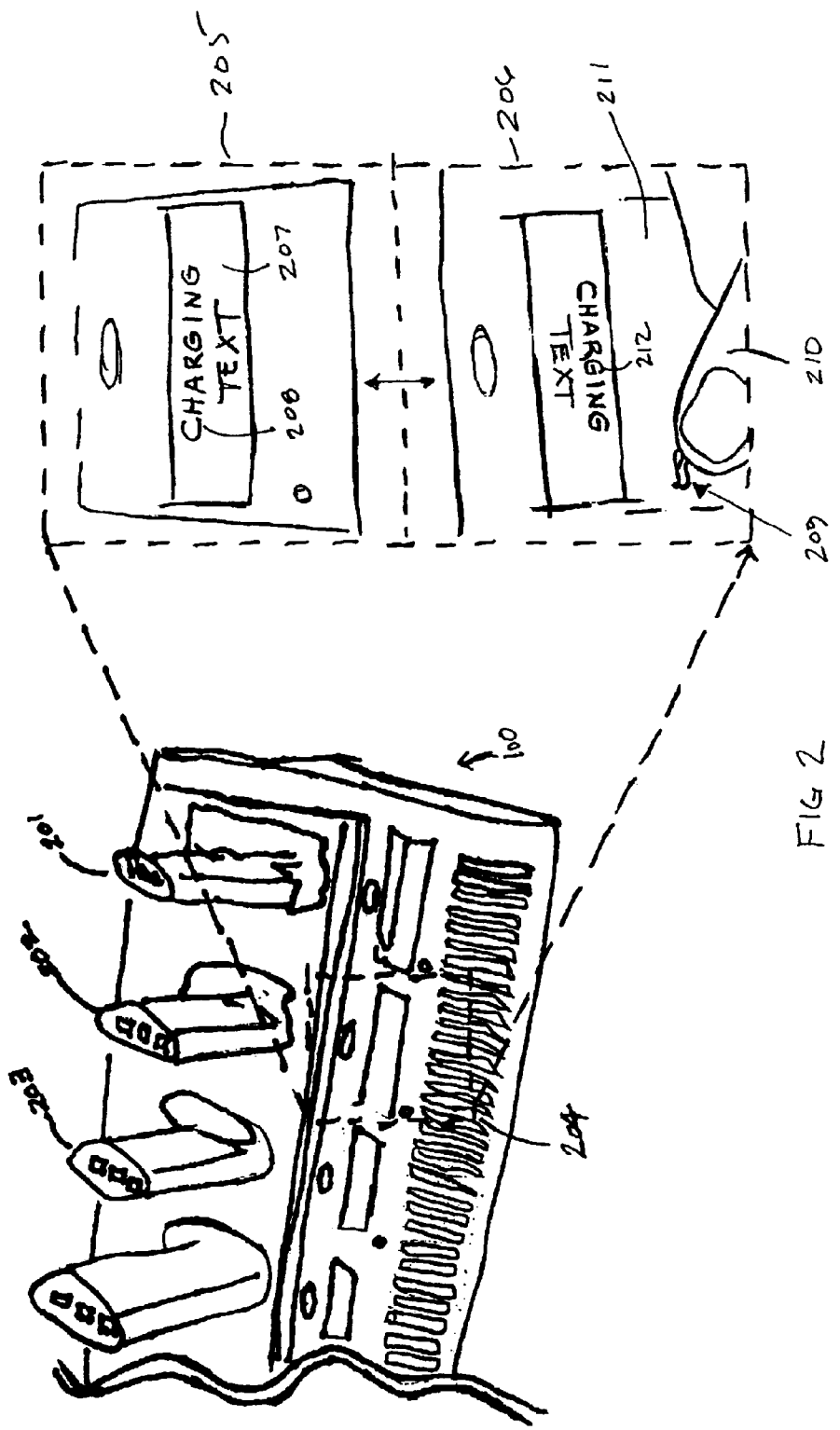
FIG. 2 is a sectional view of a charger in accordance with the invention with a small portion of the charger enlarged so as to see the reversible action of the display in accordance with the invention.

Each display 114–116 includes what appears to the user to be a hole 117,118,119. The hole is actually an access opening to a switch disposed below the housing. Referring now to FIG. 2, illustrated therein is the charger 100 having batteries 201,202,203 inserted therein. Dashed-line square 204 is a sectional view of one of the displays. Two embodiments of square 204 have been magnified in squares 205 and 206. Square 265 illustrates an exemplary display 207 with charging text 208 illustrated thereon. Square 205 is an example of the "desktop" mode, in which the text is legible when viewed on a desktop.

Square 206 illustrates an example of the "wall mount" mode. Note that a user holds a small tool 209 in his fingers 210. The small tool 209 is used to access the push-button switch located below the charger housing 211. The small tool 209 may be as simple as an ordinary paper clip, bent, so as to be inserted into the hole, or it may be a custom device with a cross section that matches that of the hole.

When the small tool 209 is inserted, the orientation of the text rotates by 180 degrees. This is illustrated by example text 212. By flipping the text 212, the text now becomes legible to a user viewing the charger 100 in the wall mount configuration. Note that to keep the batteries properly oriented so as not to fall out, the display becomes rotated by 180 degrees when the charger is taken from a desktop configuration to a wall mount configuration. By depressing the switch, the text on the display rotates accordingly.

The switch is preferably pressed only once. Once pressed, the circuitry stores the desired orientation in a non-volatile memory device. If the switch is pressed again, the text again rotates back to the original orientation. In other words, to change the orientation of the text, depress the switch once. The text will then stay in the new orientation, regardless of power failure due to the non-volatile memory, until it is depressed again.

Figure 3:
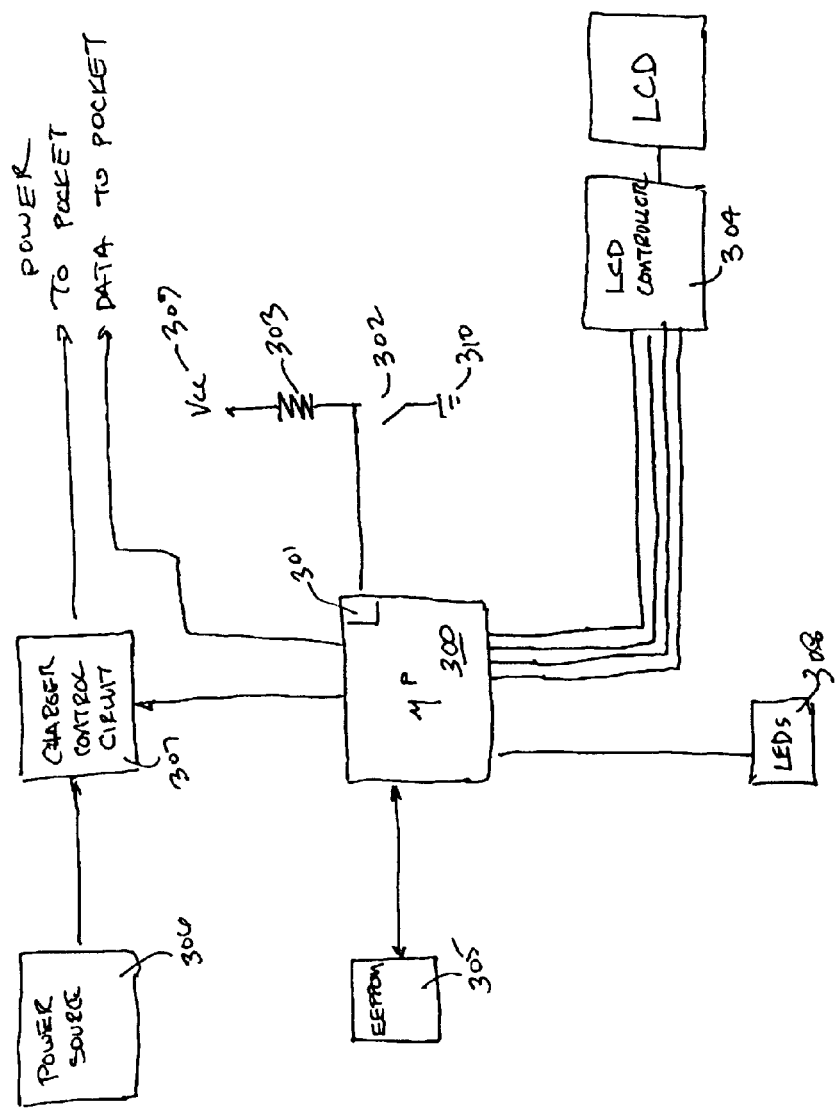
FIG. 3 is a schematic block diagram of one preferred embodiment of a display controller in accordance with the invention.

Referring now to FIG. 3, illustrated therein is a schematic block diagram in accordance with the invention. The circuit of FIG. 3 is illustrative of the circuitry associated with a single pocket, and would be replicated for the number of pockets in the charger. The circuit includes a microprocessor 300 having at least one digital input 301. The switch 302 is coupled to the input 301 and transitions states by way of a pull-up resistor 303. When the switch is depressed, the input 301 changes from Vcc 309 to ground 310. The microprocessor 300 then stores this information into a non-volatile memory device, preferably an electrically erasable, programmable, read only memory (EEPROM) 305. By writing to an EEPROM 305, the microprocessor 300 is able to recall the last desired orientation regardless of any power outages that might occur. Note that flash memory devices could be substituted for the EEPROM.

The microprocessor 300 then sends the orientation information to the LCD controller 304. Examples of suitable LCD controllers include the S6A0093 manufactured by Samsung. The microprocessor 300 sends refresh data to the LCD controller 304 causing it to refresh in reverse, thereby inverting the image on the display. In addition to communicating with the LCD controller 304, the microprocessor 300 also controls charging circuitry 307 coupled to a power source 306, as well as the LEDs 308.

Note that the circuit of FIG. 3 includes a "dual function" microprocessor 300, in that the microprocessor 300 controls both the LCD controller 304 and the charging circuitry 307. In multi-pocket applications, it is often advantageous to separate the control of the charging circuitry and the data/display functions. This separation provides the designer with the ability to customize the features of the pocket without interfering with the charging circuitry. For example, if one wants a high-power microprocessor for diagnostics, yet a low-power microprocessor to control charging, this can be accomplished by separating the charging circuitry and the data/display circuitry.

Figure 4:
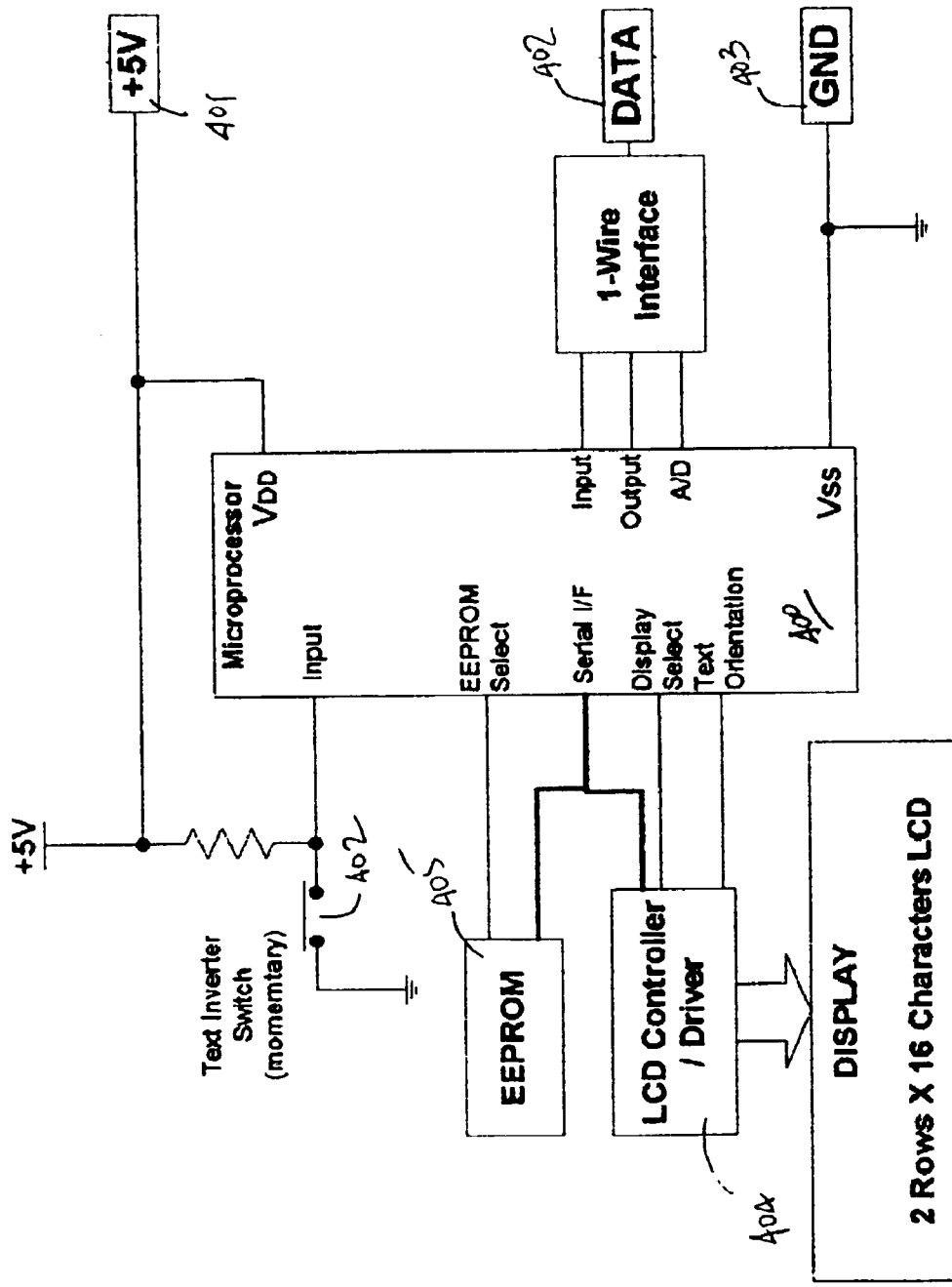
FIG. 4 is a schematic block diagram of another preferred embodiment of a display controller in accordance with the invention.

Referring now to FIG. 4, illustrated therein is the display circuitry, which has been separated from the charging circuitry. A microprocessor 400 receives battery data from charging circuitry (shown in FIG. 5) through a data terminal 402. The circuit receives power from a power 401 and a return 403 terminals, both coming from the charging circuitry. As in FIG. 3, a switch 405 actuates the rotation of the text. The microprocessor 400 stores the text orientation in the EEPROM 405. The microprocessor 400 further controls the LCD driver 404.

Figure 5:
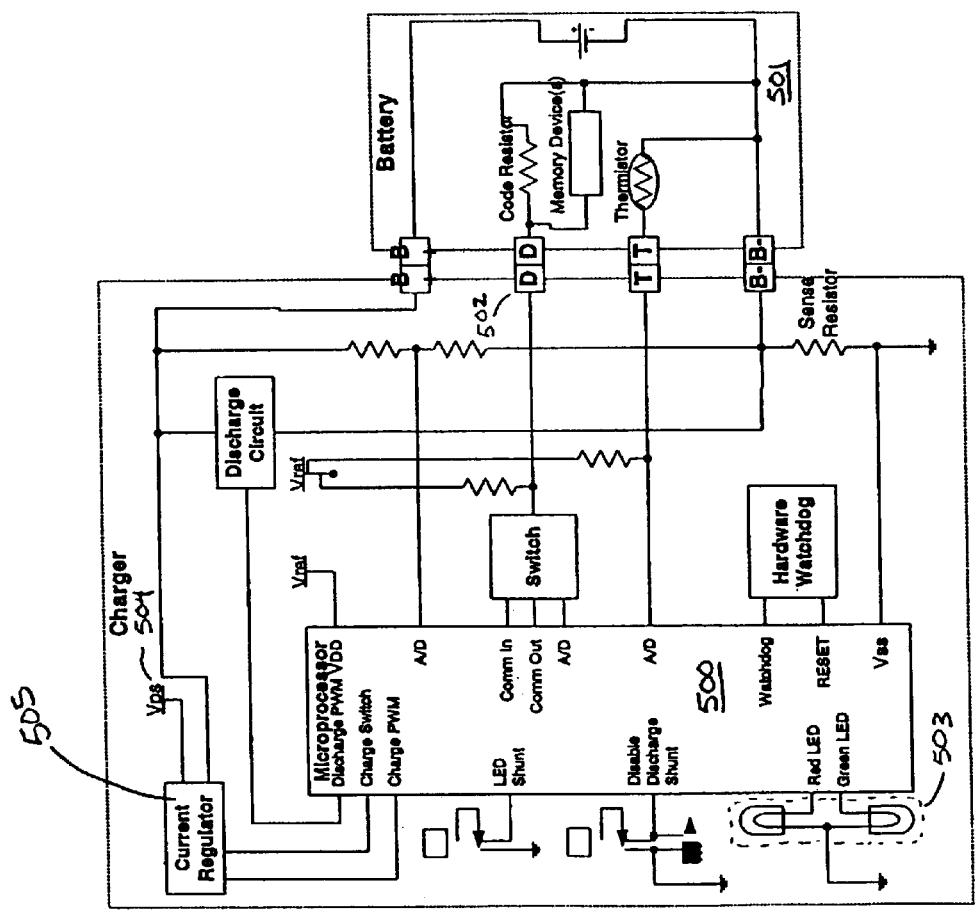
FIG. 5 is a schematic block diagram of a charging circuit in accordance with the invention.

Referring now to FIG. 5, illustrated therein is a general charging circuit that may be applied to charge a battery 501 placed in the pocket of the charger. A microprocessor 500 (which is distinct from the microprocessor of FIG. 4) receives data from the battery 501 by way of a data terminal 502. This microprocessor 500 controls charging current by way of a current regulator 505 coupled to the power supply 504. Note that the LEDs (shown as, e.g. 111 in FIG. 1) are shown as 503, and are controlled by the microprocessor 500.

While the preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. For example, the microprocessor 300 may be programmed to provide additional features. When the button is pressed for a predetermined period of time, for instance, the display might enter a test mode. In the test mode, the display cycles through a series of data, thereby allowing the user to evaluate display functionality. Such data may include all pixels on, all pixels off, checkerboard pixel pattern, text right-side up, and text upside down. To exit this test mode, the button is pressed again.

What is claimed is:

1. A battery charger, comprising:
   a. a base member;
   b. an inclined plane coupled to the base member at an angle between 30 and 60 degrees with respect to the base member;
   c. at least one pocket for receiving a rechargeable battery, the at least one pocket having electrical contacts disposed within the inclined plane;
   d. a microprocessor coupled to the electrical contacts;
   e. at least one display electrically coupled to the microprocessor; and f. a switch electrically coupled to the microprocessor;

wherein when the switch is actuated, the microprocessor causes data on the display to change from a first orientation to a second orientation.

2. The charger of claim 1, wherein the switch is disposed within the charger.

3. The charger of claim 2, wherein access to the switch is provided by an opening in the exterior of the charger.

4. The charger of claim 3, wherein a user actuates the switch by inserting a small tool into the opening in the exterior of the charger.

5. The charger of claim 4, wherein the display comprises a liquid crystal display.

6. The charger of claim 1, wherein the second orientation is a 180-degree rotation of the first orientation.

7. The charger of claim 6, wherein a depth of the at least one pocket is at least half of a length of the rechargeable battery.

8. The charger of claim 1, further comprising a non-volatile memory coupled to the microprocessor, wherein when the switch is actuated, the corresponding orientation is stored by the microprocessor in the non-volatile memory.

9. The charger of claim 8, wherein the non-volatile memory is selected from the group consisting of electrically erasable read-only memories and flash memories.

10. A charger capable of being mounted in both a vertical orientation and a horizontal orientation, comprising:

a. a plurality of pockets capable of supporting rechargeable batteries either when the charger is in the vertical orientation or the horizontal orientation;

b. a plurality of displays electrically coupled to the plurality of pockets, respectively; and c. a plurality of switches coupled to the plurality of displays, respectively;

wherein when a user actuates any one of the plurality of switches, information shown on the display rotates 180 degrees.

11. The charger of claim 10, wherein the plurality of switches are disposed within the charger.

12. The charger of claim 11, wherein access to the plurality of switches is provided by a plurality of openings disposed on the exterior of the charger.

13. The charger of claim 12, wherein a user actuates one of the plurality of switches by inserting a small tool into one of the plurality of openings on the exterior of the charger.

14. The charger of claim 13, wherein a depth of the plurality of pockets is at least half of a length of the rechargeable batteries.

15. The charger of claim 14, further comprising a plurality of microprocessors coupled to the plurality of pockets, respectively, and a plurality of non-volatile memories coupled to the plurality of microprocessors, wherein when one of the plurality of switches is actuated, the corresponding display rotation is stored by the corresponding microprocessor in the corresponding non-volatile memory.

16. The charger of claim 15, wherein when one of the plurality of switches is actuated for a predetermined amount of time, the corresponding microprocessor enters a test mode.

* * * * *